United States Patent [19]

Sekmakas et al.

[11] Patent Number: 4,598,109

[45] Date of Patent: * Jul. 1, 1986

[54] PRODUCTION OF EPOXY PHOSPHATES

[75] Inventors: Kazys Sekmakas, Palatine; Raj Shah, Schaumburg, both of Ill.

[73] Assignee: DeSoto, Inc., Des Plaines, Ill.

[ * ] Notice: The portion of the term of this patent subsequent to Jan. 10, 2001 has been disclaimed.

[21] Appl. No.: 662,162

[22] Filed: Oct. 18, 1984

[51] Int. Cl.$^4$ .............................................. C08G 59/14
[52] U.S. Cl. .................... 523/414; 523/402; 523/416; 524/841; 525/510; 525/523; 528/108
[58] Field of Search ...................... 523/414, 416, 402; 524/841; 528/108; 525/523, 510

[56] References Cited

U.S. PATENT DOCUMENTS

| | | | |
|---|---|---|---|
| 4,397,970 | 8/1983 | Campbell et al. | 525/524 X |
| 4,425,451 | 1/1984 | Sekmakas et al. | 528/109 X |
| 4,461,857 | 7/1984 | Sekmakas et al. | 528/398 X |

Primary Examiner—Paul R. Michl

Attorney, Agent, or Firm—Dressler, Goldsmith, Shore, Sutker & Milnamow, Ltd.

[57] ABSTRACT

A process of producing a water dispersible epoxy phosphate-solvent mixture is disclosed which comprises heating the solvent with orthophosphoric acid to reaction temperature together with additional water so that the total amount of water is sufficient to hydrolyze at least about 50% of the oxirane functionality in the polyepoxide which is used, slowly adding a resinous polyepoxide to this heated mixture so that reaction with phosphoric acid and hydrolysis of the oxirane groups will occur simultaneously to minimize the concentration of oxirane functionality in the reaction mixture as the reaction proceeds, thus minimizing epoxy-epoxy reactions which tend to increase the molecular weight of the epoxy phosphate which is formed, and then adding volatile amine to destroy any remaining oxirane functionality and to neutralize the epoxy phosphate to provide a water dispersible epoxy phosphate-solvent mixture.

18 Claims, No Drawings

PRODUCTION OF EPOXY PHOSPHATES

DESCRIPTION

1. Technical Field

This invention relates to the production of epoxy phosphates having improved properties by a simplified process, and includes the resulting product.

2. Background Art

Epoxy phosphates are known and have many uses in polymer chemistry. However, the provision of epoxy phosphates which can be stably dispersed in aqueous medium has represented a difficult problem, as illustrated in U.S. Pat. No. 4,397,970 in which resort is had to reacting the resinous polyepoxide with a phorphorous oxide or a mixture thereof with a limited amount of water insufficient to hydrate the phosphorous oxide to orthophosphoric acid. The reaction product is subsequently hydrolyzed by reaction with water. As a result, an excessive proportion of phosphorous is needed, the reaction procedure is difficult, and the product includes high molecular weight material which increases the viscosity in aqueous solution or dispersion.

This patent points out that if the deficiency of water is not present, the resulting epoxy phosphate does not disperse in water.

Reference is also made to our previous U.S. Pat. Nos. 4,425,451 and 4,461,857, in which we reacted a resinous polyepoxide with orthophosphoric acid in the presence of a solvent, and then employed a large proportion of volatile amine so that the unreacted oxirane functionality is destroyed by the presence of the large amount of amine. This process produced epoxy phosphates which are dispersible in water with the amine, the solvent being essential to this capacity to provide water dispersibility. However, this reaction is not as simple as desired. Moreover, while the proportion of acid and amine were acceptably low with polyepoxides of high molecular weight, low molecular weight polyepoxides possess low epoxide equivalent weights, and thus demand large weight proportions of phosphoric acid and volatile amine when the teachings of our prior patents are used. These large amounts of acid and amine degrade product performance, and this is why our prior patents prefer polyepoxides of high molecular weight.

DISCLOSURE OF INVENTION

In accordance with this invention, a process of producing a water dispersible epoxy phosphate-solvent mixture comprises heating the solvent with orthophosphoric acid (which contains water) to reaction temperature together with an amount of water such that the total amount of water is sufficient to hydrolyze at least about 50% of the oxirane functionality in the polyepoxide which is used. A resinous polyepoxide is slowly added to the heated mixture so that reaction with phosphoric acid and hydrolysis of the oxirane groups will occur simultaneously to minimize the concentration of oxirane functionality in the reaction mixture as the reaction proceeds. This minimizes epoxy-epoxy reactions which increase the molecular weight of the product. A volatile amine is then added to destroy (eliminate) any remaining oxirane functionality. The amine will also partially or fully neutralize the acidity of the epoxy phosphate to provide a water dispersible epoxy phosphate-solvent mixture.

Since the oxirane content is greatly reduced by hydrolysis, the proportion of added volatile amine is now entirely determined by that which is needed for water dispersibility, and when the epoxide equivalent weight of the selected polyepoxide is low the proportion of amine can be much lower in this invention than in our prior patents.

The proportion of water can be increased above the minimum specified above and may far exceed the equivalents of polyepoxide, as illustrated in Example 1 hereinafter. The amount of water is preferably at least about 75% of the oxirane functionality in the epoxy resin reactant.

The reaction temperature will vary with the availability of pressure, but it is preferred to use a relatively high boiling solvent, like 2-butoxy ethanol, and to use temperatures near the boiling point of water, e.g., 100° to 105° C.

While any water miscible organic solvent can be used, like acetone, butanol, isopropanol, and the like, the ether alcohols illustrated by the preferred 2-butoxy ethanol, are preferred. The proportion of volatile amine may be large, as in our prior patent, or it can be greatly reduced for low molecular weight polyepoxides, as illustrated in Example 2, so it is no longer a feature of this invention.

One deficiency in the process of our prior patents is that it required that the epoxy resin be dissolved in the solvent before reaction with the phosphoric acid. With Epon 1007 from Shell, which is a diglycidyl ether of bisphenol A having an average molcular weight of about 4500, this demands heating to about 125° C. Dissolution is slow because there is no chemical reaction to speed the process. In this invention, the solvent containing water and phosphoric acid is heated to a lower temperature of about 105° C., and this is adequate to provide a rapid dissolving of the Epon 1007 flakes as they are slowly added because these flakes react with the water and the phosphoric acid to speed the process of solvation by the solvent. In part because of the greater ease of dissolving the polyepoxide and in part because of the lower molecular weight of the epoxy phosphate product, less solvent is needed.

The process of our prior patents was further characterized by a preference for epoxy resins of relatively high molecular weight, the Epon 1007 noted above being the preferred material. In the process of this invention, one can still use Epon 1007 and obtain important advantages, but in many instances it is now preferred to use epoxy resins of much lower molecular weight, such as Epon 828 which is a diglycidyl ether of bisphenol A having an average molecular weight of about 380. These lower molecular weight polyepoxides are useful in many coating combinations now that the proportion of acid and the proportion of amine are reduced to more practical levels.

This invention also provides epoxy esters which, in coating compositions comprising an aminoplast or phenoplast curing agent, cure to provide improved adhesion and improved physical toughness (evidenced by superior abrasion resistance). Thus, and aside from the more convenient process, the improved product uniformity, the use of less solvent and the opportunity to provide solutions using epoxy resins of lower molecular weight, this invention provides products which are better because they provide superior coating compositions.

The proportion of orthophosphoric acid should be sufficient to provide from about 0.03 to about 0.9 moles of this acid per oxirane equivalent in the polyepoxide, but it is preferred to use from 0.05 to 0.3 moles of this acid on the same basis. The presence of the phosphoric acid provides acidity which can be neutralized for salt formation, these salt groups enhancing dispersion in water. When the neutralizing volatile amine, which is conventional and includes ammonia, are removed after coating, the phosphoric acid groups catalyze the cure, especially with aminoplast resin. The amount of phosphoric acid used is adjusted to provide the desired water dispersibility and cure enhancement, and these factors will vary with the polyepoxide selected, the proportion of solvent and the cure which is desired.

The resinous polyepoxides used herein may be constituted by any resinous polyepoxide having a 1,2-epoxy equivalency in excess of 1.2, but preferably from 1.4 to 2.0. Diglycidyl ethers of a bisphenol, such as bisphenol A, having an average molecular weight in the range of 350-7000 are preferred. Products of this type of both high and low molecular weights are illustrated in the examples.

The volatile amines which are used for neutralization are themselves well known, dimethyl ethanol amine being preferred herein, as illustrated in the examples.

The aminoplast and phenoplast resins which can be used herein are well known, and any of these which are used in aqueous coating compositions are useful herein. Hexamethoxymethyl melamine is preferred herein, as illustrated in the examples.

All sorts of aqueous coating compositions can be benefitted by use of the epoxy phosphates of this invention in place of the epoxy phosphates previously used. Several of these aqueous coating compositions are illustrated in U.S. Pat. No. 4,461,857.

EXAMPLE 1

355 grams of 2-butoxy ethanol are mixed with 24 grams of 85% orthophosphoric acid and 40 grams of deionized water are placed in a 5-liter flask equipped with a reflux condenser and heated, with agitation, to 105° C. and then 914 grams of a diglycidyl ether of bisphenol A having an average molecular weight of 4500 (the Shell product Epon 1007 may be used) are slowly added. The added material is a solid and is added as flakes over a period of 30 minutes while maintaining the 105° C. temperature. In this way the orthophosphoric acid reacts with some of the oxirane groups in the diglycidyl ether, and many of the oxirane groups are hydrolyzed as the reaction proceeds, thus minimizing the proportion of unreacted oxirane groups in the reactor. The reaction mixture is maintained at 105° C. for 2 hours to insure completion of the esterification and hydrolysis reactions, and then the reaction mixture is cooled to 80° C.

50 grams of dimethyl ethanol amine are separately mixed into 100 grams of deionized water and this mixture is then added to the reactor over a period of 15 minutes and the reaction mixture is then held at 80° C. for 30 minutes. This completes the hydrolysis reaction and neutralizes enough of the unreacted acidity of the phosphoric acid (which is essentially monofunctional in the reaction with oxirane) to enable dispersion in water in the presence of the large amount of 2-butoxy ethanol present.

200 grams of a hexamethoxy methyl melamine (the American Cyanamid product Cymel 303 may be used) are mixed into the neutralized reaction mixture at 70° C. and agitation is continued for 30 minutes to insure an intimate blending of this aminoplast curing agent with the epoxy phosphate product. 2330 grams of deionized water is then added over a period of 90 minutes with rapid agitation to produce a milky dispersion having a solids content of 29.9%.

This dispersion is equivalent to the product which can be produced using the process of U.S. Pat. No. 4,425,451 in which the same ratio of 914 parts of Epon 1007 to 24 parts of 85% orthophosphoric acid is used, but in the prior process it was necessary to heat the Epon 1007 to 125° C. and to hold it there for a long time while it dissolved in the 2-butoxy ethanol. Moreover, it took a total of 540 parts of 2-butoxy ethanol to handle the 914 parts of Epon 1007, while only 355 parts of 2-butoxy ethanol are required in this Example. Still further, heat blending the aminoplast curing agent with the epoxy phosphate solution provides a more uniform aqueous dispersion, and it was difficult to do this in our prior disclosure so that the aminoplast resin had to be added to the final water dispersion, and it is advantageous to avoid this post blending operation.

EXAMPLE 2

576 grams of 85% phosphoric acid (4.96 moles) are mixed in a 5-liter flask equipped with a reflux condenser with 2000 grams of 2-butoxy ethanol and 576 grams of water (32 moles) and heated to 100° C.

8400 grams of a diglycidyl ether of bisphenol A having an average molecular weight of about 380 to provide 44.16 equivalents of oxirane (the Shell product Epon 828 may be used) are mixed with 2000 grams of 2-butoxy ethanol and added to the reactor over a 2 hour period while maintaining a temperature of 97°–100° C. The reaction mixture is then held at 100° C. for 1 hour and cooled to 80° C.

There is then separately mixed 576 grams of dimethyl ethanol amine (6.4 moles) and 800 grams of 2-butoxy ethanol, and the mixture is added to the reaction mixture over a 30 minute period at 80° C. This product is then cooled to provide the final water-dispersible epoxy phosphate solution in which the oxirane groups which have not reacted with the phosphoric acid have been substantially completely hydrolyzed. This product has a solids content of 72.2%, a Gardner-Holdt viscosity of $Z_4$–$Z_5$, and a Gardner color of 2–3.

The product of Example 1 can be used in place of the epoxy phosphate described in U.S. Pat. No. 4,461,857 Example 5 to produce corresponding results in Examples 4 and 6 of that patent, superior adhesion and abrasion resistance being obtained.

The product of Example 2 is also useful in the combinations disclosed in U.S. Pat. No. 4,425,451, but it is particularly useful for the coating of aluminum foil.

What is claimed is:

1. A process of producing a water dispersible epoxy phosphate-solvent mixture comprising heating said solvent with orthophosphoric acid to reaction temperature together with an amount of water such that the total amount of water is sufficient to hydrolyze at least about 50% of the oxirane functionality in the polyepoxide which is used, slowly adding a resinous polyepoxide to said heated mixture so that reaction with phosphoric acid and hydrolysis of the oxirane will occur simultaneously to minimize the concentration of oxirane functionality in the reaction mixture as the reaction proceeds, thus minimizing epoxy-epoxy reactions which increase the molecular weight of the epoxy phosphate which is formed, and then adding volatile amine to destroy any remaining oxirane functionality and to partially or fully neutralize the epoxy phosphate to provide a water dispersible epoxy phosphate-solvent mixture.

2. A process as recited in claim 1 in which said water is present in an amount to hydrolyze at least about 75% of the oxirane functionality in the polyepoxide which is used.

3. A process as recited in claim 1 in which said phosphoric acid is used in an amount to provide from about 0.03 to about 0.9 moles of acid per equivalent of oxirane functionality.

4. A process as recited in claim 1 in which said phosphoric acid is used in an amount to provide from about 0.05 to about 0.3 moles of acid per equivalent of oxirane functionality.

5. A process as recited in claim 1 in which said polyepoxide is a diglycidyl ether of a bisphenol having an average molecular weight in the range of 350–7000.

6. A process as recited in claim 1 in which said reaction temperature is in the range of 100°–105° C.

7. A process as recited in claim 1 in which said solvent is an ether alcohol.

8. A process as recited in claim 7 in which said ether alcohol is 2-butoxy ethanol.

9. A process as recited in claim 1 in which said epoxy-phosphate solution is heated to blend the same with aminoplast resin prior to dispersion in water.

10. A process as recited in claim 5 in which said diglycidyl ether has an average molecular weight of about 380.

11. A process of producing a water dispersible epoxy phosphate-solvent mixture comprising heating said solvent with orthophosphoric acid to a reaction temperature in the range of about 100°–105° C. together with an amount of water such that the total amount of water is sufficient to hydrolyze at least about 75% of the oxirane functionality in the polyepoxide which is used, said orthophosphoric acid being present in an amount to provide from about 0.05 to about 0.3 moles of acid per equivalent of oxirane functionality, slowly adding a diglycidyl ether of a bisphenol having an average molecular weight in the range of about 350–7000 to said heated mixture so that reaction with phosphoric acid and hydrolysis of the oxirane groups will occur simultaneously to minimize the concentration of oxirane functionality in the reaction mixture as the reaction proceeds, thus minimizing epoxy-epoxy reactions which increase the molecular weight of the epoxy phosphate which is formed, and then adding volatile amine to destroy any remaining oxirane functionality and to neutralize the epoxy phosphate to provide a water dispersible epoxy phosphate-solvent mixture.

12. A process as recited in claim 1 in which said epoxy-phosphate solution is heated to blend the same with aminoplast resin prior to dispersion in water.

13. The product of the process of claim 1.
14. The product of the process of claim 11.
15. The product of the process of claim 12.
16. An aqueous dispersion of the product of claim 13.
17. An aqueous dispersion of the product of claim 14.
18. An aqueous dispersion of the product of claim 15.

* * * * *